Patented May 1, 1951

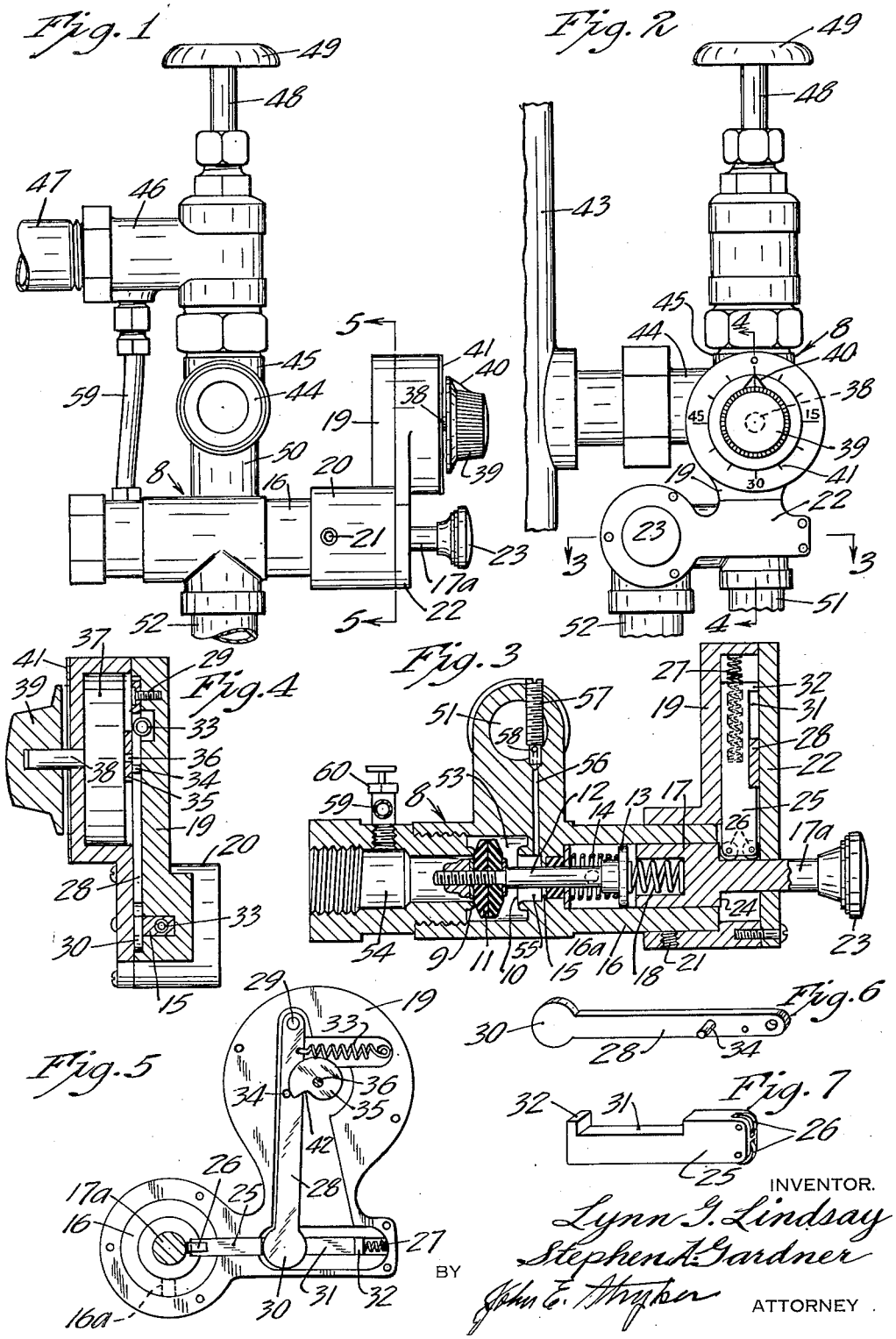

2,551,445

UNITED STATES PATENT OFFICE 2,551,445

VALVE CONTROL MECHANISM

Lynn G. Lindsay, St. Paul, and Stephen A. Gardner, Minneapolis, Minn.; said Gardner assignor to said Lindsay Application August 4, 1947, Serial No. 766,046

3 Claims. (Cl. 161—7)

This invention relates to valve mechanism of the type adapted to be set in one position manually to control the flow of fluid through a conduit and having simple time control means for automatically cutting off the flow or changing the direction of flow after the elapse of a predetermined period of time.

It is an object of our invention to provide valve mechanism of this type with novel, reliable and simple timing mechanism.

A particular object is to provide in association with a valve member which is spring biased to one position and adapted to be manually set in another position, novel and improved spring actuated timing mechanism whereby the valve member is caused to move to the first mentioned position after the elapse of a pre-determined period of time.

Another object is to provide a time control of the class described for a three-port, two-way valve particularly although not exclusively adapted for use in connection with water softening apparatus wherein the softening material requires periodic regeneration.

Our invention also includes certain novel details of construction which will be more fully pointed out in the following specification and claims.

Referring to the accompanying drawing which illustrates a preferred embodiment of our invention by way of example and not for the purpose of limitation:

Figure 1 is a side elevational view showing our improved control in connection with valve mechanism of a type adapted for use in connection with water softening apparatus;

Fig. 2 is an end elevational view of the same;

Fig. 3 is a horizontal section through the main valve casing and control mechanism taken on the line 3—3 of Fig. 2;

Fig. 4 is a fragmentary vertical section taken approximately on the line 4—4 of Fig. 2;

Fig. 5 is a part vertical section, taken on the line 5—5 of Fig. 1, and part elevational view with a portion of the housing removed;

Fig. 6 is a perspective view of the hammer member, and

Fig. 7 is a perspective view of the latch member.

In the drawing, the numeral 8 indicates the main casing member of our valve mechanism, which is of the three-port, two-way type, formed with suitable passages for conducting fluid and having parallel seats 9 and 10 for engagement with a valve head 11 constituting a closure member. As shown in Fig. 3, the head 11 is mounted on one end of a longitudinally movable rod 12 and fixed on the opposite end of the rod 12 is a flange member 13 which confines a coiled spring 14 on the rod. This spring biases the rod 12 and head 11 to a position where the head 11 is closed against the seat 10, one end of the spring abutting against a bearing 15 slidably supporting the rod in the casing. A suitable sealing ring is confined under compression about the rod 12 to minimize leakage from the valve passages into a cylindrical extension 16 of the casing in which a plunger 17 is movable in axial alignment with the head 11 and rod 12. This plunger carries on its inner end a coiled spring 18 for engagement with the outer end of the flange member 13.

Latch and timing devices for the valve are mounted in a housing 19 which is carried by the casing extension 16, the housing being formed with a cylindrical end portion 20 fitting the casing member 16 and held in place thereon by suitable set screws 21. A drain hole 16a is formed in the bottom of extension 16 to permit the escape of any liquid which may leak into this plunger guide. At its outer face the housing 19 has a removable closure plate 22 and a reduced end portion 17a of the plunger 17 projects through an opening in the plate 22 and is provided with a knob 23 adapted to be manipulated to seat the valve head 11 in its closed position against the seat 9. Formed on the plunger 17 is a radially extending stop surface 24 for engagement with a latch member indicated generally by the numeral 25. This latch is movable substantially radially of the plunger to and from engagement with the stop surface 24 and is guided between radially extending surfaces formed in the housing 19, which surfaces are substantially perpendicular to the axis and direction of movement of the plunger 17. Anti-friction rollers 26 are carried by the latch member 25 to make rolling contact with the opposed radial guide surfaces of the housing. A light compression spring 27 is arranged to bias the latch member 25 toward locking position in relation to the stop surface 24, this spring being confined between the inner top surface of the housing 19 and a surface of the latch member 25 at the lower end of a socket extending down from the upper end of the latch member.

To actuate the latch member 25 to valve release position, against the action of the spring 27, we provide a hammer 28 having a pivotal support 29 at its upper end in the housing 19 and having a head 30 at its lower end adapted to oscillate in a recess 31 formed in the latch member 25. This recess is defined at one end by a lug 32 which is located in the path of the hammer head 30 so as to be struck thereby to move the latch member to its retracted position with reference to the stop surface 24. The hammer 28 is biased toward its striking position by means of a spring 33 having one end connected to the hammer and anchored at the other end within the housing 19.

A pin 34 projects from the hammer 28 for sliding contact with the periphery of a rotary cam 35 which is mounted on a spindle 36 projecting from spring actuated timing mechanism contained in a casing 37. This timing mechanism is of the conventional clock type adapted to rotate the spindle 36 at a predetermined rate by power stored in a main spring. The clock spring may be wound by turning a spindle 38 carrying a knob 39 adapted to be turned by hand. As indicated in Figs. 1, 2 and 4, the spindle 38 projects to the exterior of the housing 19 and the knob 39 carries a pointer 40 adapted by reference to a dial 41 to indicate the period of time in minutes during which the valve mechanism is to be held in predetermined position. When the pointer 40 has been set manually for a selected period, the clock mechanism turns the cam 35 in the direction indicated by an arrow in Fig. 5 and also returns the pointer 40 to the starting or zero position at a uniform, predetermined rate. The pin 34 is held in contact with the periphery of the cam 35 and the latter is provided with a recess 42 into which the pin 34 is moved by the action of the spring 33 at the end of the selected period, thus causing the hammer 28 to strike the lug 32 and thereby withdraw the latch member 15 from engagement with the stop surface 24 on the plunger 17.

Our anti-friction rollers 26 facilitate the movement of the latch member 25 which is held under lateral pressure when in its locking position relative to the plunger 17, the latter being biased toward the latch member by the springs 14 and 18. Both of these springs are under compression when the head 11 is in its closed position against the seat 9 and the spring 18 is relatively stiff but only slightly deflected so that it insures firm seating of the valve head at seat 9. When the plunger 17 is released, the relatively stiff spring 18 expands to its maximum length while the spring 14 continues to expand sufficiently to close the head 11 against the seat 10.

Connections which adapt the valve mechanism hereinbefore described for use in the control of water softening apparatus are shown in Figs. 1, 2 and 3 of the drawing. This apparatus includes a tank 43 through which the water to be softened is caused to flow and containing the water softening material requiring periodic regeneration. The upper portion of the tank 43 is shown connected to a branch 44 of a valve casing 45. Hard water may be supplied to the casing 45 through a branch 46 and a pipe 47. A valve operating stem 48 is provided with a handle 49 and carries a closure head in the casing 45 which is movable to an upper position in which it cuts off the supply of hard water to the casing 45 from the branch 46 and also to a lower portion where it cuts off direct communication between the branch 44 and a downwardly extending branch 50 of the casing communicating with a drain pipe 51. In communication with the tank 43 at an elevation below the body of water softening material therein is a pipe 52 extending upward to a chamber 53 formed in the casing 8.

Soft water may be discharged from the casing 8 through a port 54 adapted to be connected to a service pipe and there is a port 55 communicating with the drain pipe 51 through a restricted passage 56 in the valve casing. Disposed in axial alignment with the passage 56 is a screw 57 formed with a passage 58, the size of which determines the rate of flow from the chamber 55 to the drain pipe 51. To by-pass water from the supply pipe 47 to the service pipe, we provide a small pipe 59 under control of a needle valve 60 (Fig. 3), the upper end of the pipe 59 being connected to the branch 46 and the lower end to the casing 8 so as to communicate with the port 54. The needle valve 60 has a small passage which is continuously open to allow sufficient water to pass into the port 54 to balance the pressure on the opposite faces of the valve head 11 when the latter is closed against its seat 9 and the service outlets from the service pipe are closed.

During the normal water softening operation the valve head 11 remains closed against its seat 10 and the closure head in the casing 45 is closed against its lower seat so that the hard water passes into the upper portion of the tank 43 from the pipe 47 through the valve branches 46 and 44. In passing downward through the softening material in the tank 43 the water is softened and then flows from the bottom of the tank up through the pipe 52 and through the valve chamber 53 past the seat 9 to the port 54 and service pipe. Flow through the by-pass pipe 59 is so restricted that only a negligible amount of hard water reaches the service pipe through the port 54.

When it is desired to regenerate the body of softening material in the tank 43, the valve handle 49 is first turned upward to cut off the passage of hard water to the softening tank, except for the small amount which flows through the pipe 59. Now the tank cap or manhole cover, not shown, is removed and water is allowed to drain from the top of the tank through the branches 44 and 50 to the drain pipe 51. Thereupon a charge of regenerating material (such as common salt or other required reagent) is placed in the tank 43 through the cover opening and the cover is closed and secured in place. Finally the valve handle 49 is turned down to allow flow from the pipe 47 through casing branches 46 and 44 to the upper portion of the tank 43 and to close direct communication between branches 44 and 50.

To set our improved time control for the regenerating and flushing cycle, the valve head 11 is closed against its seat 9 by manipulation of the knob 23 on plunger 17 against the action of the springs 14 and 18. As the stop surface 24 passes inward beyond the latch member 25 the latter is projected into the path of the surface 24 so that when the knob 23 is released the valve head 11 is locked in the position shown in Fig. 3. The operator then turns the clock knob 39 so that the pointer 40 indicates the desired regenerating and flushing time on the dial 41. The clock mechanism thereupon rotates the cam 35 until the pin 34 drops into the notch 42 and releases the hammer 28 so that it is actuated by the spring 33 to strike the lug 32 and thereby retract the latch member 15 from engagement with the plunger surface 24. This causes the head 11 to close against its seat 10, thereby cutting off communication between the drain pipe 51 and valve chamber 53, and at the same time opening communication between the service pipe and tank outlet pipe 52 through valve chamber 53.

Regeneration of the water softening material in the tank 43 takes place during the period when the valve head 11 remains closed against its seat 9. During this period hard water from the pipe 47 flows into the upper portion of the tank 43 through the valve branches 46 and 44 and carries the brine or other regenerating solution downward through the body of water softening material. The spent solution flows upward through the pipe 52 to the chamber 53 and out through the passages 56 and 58 into the drain pipe 51, the rate of flow being determined by the size of the passage 58. This spent solution is followed by wash water and the duration of the regenerating and flushing treatment is determined by the time required for the cam 35 to move from its initially set position to a position where the pin 34 enters the notch 42. The time required for the regenerating and flushing rarely exceeds 45 minutes where the presently available water softening materials are used.

During the regeneration, pressure on opposite faces of the valve head 11 is balanced by allowing a small amount of water to flow through the pipe 59 into the port 54 while the opposite face of the head 11 is subject to the same fluid pressure. We thus guard against the holding of the head 11 in contact with its seat 9 by sufficient fluid pressure to prevent the expansion of the springs 14 and 18 when the valve mechanism is released by the latch member 25.

An important advantage is derived from our arrangement of simple and rugged mechanism, including the latch member 25 and hammer 28 for releasing the valve closure member at the end of a selected period of time. The momentum of the hammer 28 insures quick withdrawal of the latch member 25 and instantaneous movement of the valve head from the seat 9 to the seat 10. The anti-friction rollers 26 facilitate this movement and minimize the power required to actuate the latch mechanism.

It will be evident that our invention may be used in arrangements differing radically from those described herein without departing from the spirit of our invention as defined in the appended claims.

Having described our invention, what we claim as new and desire to protect by Letters Patent is:

1. For a valve having a member which is biased to a first position and adapted to be set in a second position, a control comprising, a plunger operatively connected to said valve member, a latch member movable to and from locking relation to said plunger whereby said valve member may be held in said second position and released to said first position, means for actuating said latch member to holding position relative to said plunger, a hammer member disposed to strike and actuate said latch member for releasing the plunger, a spring disposed to bias said hammer toward striking position, clock operated timing means and cam means operatively connecting said timing means to said hammer member for causing it to strike said latch member at a predetermined time, said cam means being adapted to gradually move said hammer against the bias of said spring during the operation of said timing means.

2. For a valve having spaced parallel seats and a member which is spring biased to a first closed position against one of said seats and adapted to be set in a second closed position against the other of said seats, a control comprising, a plunger operatively connected to said valve member, a latch member movable to and from locking relation to said plunger whereby said valve member may be held in said second closed position and released to said first closed position, resilient means interposed between said plunger and valve member for retaining said valve member under compression when in said second closed position, means for actuating said latch member to holding position relative to said plunger, a hammer member disposed to actuate said latch member for releasing the plunger, a spring disposed to bias said hammer toward striking position, clock operated timing means and cam means operatively connecting said timing means to said hammer member for causing it to actuate said latch member to release the plunger after the elapse of a predetermined time, said cam means being adapted to gradually move said hammer against the bias of said spring during the operation of said timing means.

3. For a valve having a casing and a member movable to a first position and adapted to be set in a second position, a control comprising, resilient means for actuating said member to the second position, a longitudinally movable plunger operatively connected to said valve member and projecting from said casing, said plunger having a substantially radially extending stop surface, a latch member movable substantially radially of the plunger to and from engagement with said stop surface, a housing carried by said casing, containing said latch member and having spaced parallel guide surfaces between which said latch member is confined and extending substantially perpendicularly to the longitudinal axis of said plunger, anti-friction rollers carried by said latch member for rolling contact with said guide surfaces, a latch operating member disposed in said housing to oscillate in a plane parallel to said guide surfaces and to actuate said latch member to release said plunger, cam means for actuating said latch operating member and clock operated mechanism for actuating said cam means to release said plunger after the elapse of a predetermined time.

LYNN G. LINDSAY.
STEPHEN A. GARDNER.

REFERENCES CITED

The following references are of record in the file of this patent:

UNITED STATES PATENTS

| Number | Name | Date |
|---|---|---|
| 631,025 | Merrill | Aug. 15, 1899 |
| 1,926,168 | Nylander et al. | Sept. 12, 1933 |
| 2,396,809 | Addison | Mar. 19, 1946 |